(12) United States Patent
Hack

(10) Patent No.: US 8,302,595 B2
(45) Date of Patent: Nov. 6, 2012

(54) SOLAR ABSORBER MODULE AND SOLAR ABSORBER ARRANGEMENT

(75) Inventor: Udo Hack, Heroldsbach (DE)

(73) Assignee: Saint-Gobain Indusriekeramik Rodental GmbH, Rodental (DE)

( * ) Notice: Subject to any disclaimer, the term of this patent is extended or adjusted under 35 U.S.C. 154(b) by 0 days.

(21) Appl. No.: 13/145,549

(22) PCT Filed: Feb. 1, 2010

(86) PCT No.: PCT/EP2010/051181
§ 371 (c)(1),
(2), (4) Date: Aug. 12, 2011

(87) PCT Pub. No.: WO2010/086443
PCT Pub. Date: Aug. 5, 2010

(65) Prior Publication Data
US 2011/0290236 A1 Dec. 1, 2011

(30) Foreign Application Priority Data

Jan. 30, 2009 (DE) .................. 10 2009 006 952

(51) Int. Cl.
*F24J 2/02* (2006.01)
*F24J 2/07* (2006.01)
(52) U.S. Cl. ........ 126/664; 126/680; 126/674; 126/714; 126/681
(58) Field of Classification Search .................. 126/664, 126/714, 907, 270; 3/664, 714, 907, 270
See application file for complete search history.

(56) References Cited

U.S. PATENT DOCUMENTS

| 4,088,117 | A | * | 5/1978 | Keyes | 126/658 |
| 4,413,618 | A | * | 11/1983 | Pitts et al. | 126/684 |
| 4,777,935 | A |   | 10/1988 | Fricker |  |
| 5,497,762 | A | * | 3/1996 | Rylewski | 126/702 |

(Continued)

FOREIGN PATENT DOCUMENTS
CH 669837 4/1989
(Continued)

OTHER PUBLICATIONS
PCT International Search Report for PCT/EP2010/051134 filed on Jan. 30, 2010 in the name of Saint-Gobain Industriekeramik Rodental GmbH.
(Continued)

*Primary Examiner* — Steven B McAllister
*Assistant Examiner* — Nikhil Mashruwala
(74) *Attorney, Agent, or Firm* — Steinfl & Bruno, LLP

(57) ABSTRACT

A solar absorber module is described. The module has a housing with a longitudinal axis with a first tapered housing section with a first, free end, and a second end with a reduced cross-sectional area compared to the first end, and with a second housing section adjoining the second end of the first housing section with a substantially constant cross-section over its length. The module also has a ceramic solar absorber element accommodated in the first end of the first housing section with a first surface that can be oriented toward the solar radiation with an axis of symmetry, and a second surface lying across from the first surface, wherein the solar absorber element has a large number of substantially straight channels connecting the first surface to the second surface. The solar absorber module is accommodated in the first end of the first housing section such that the axis of symmetry of the first surface is inclined relative to the longitudinal axis of the housing.

6 Claims, 11 Drawing Sheets

U.S. PATENT DOCUMENTS

Figure 1:
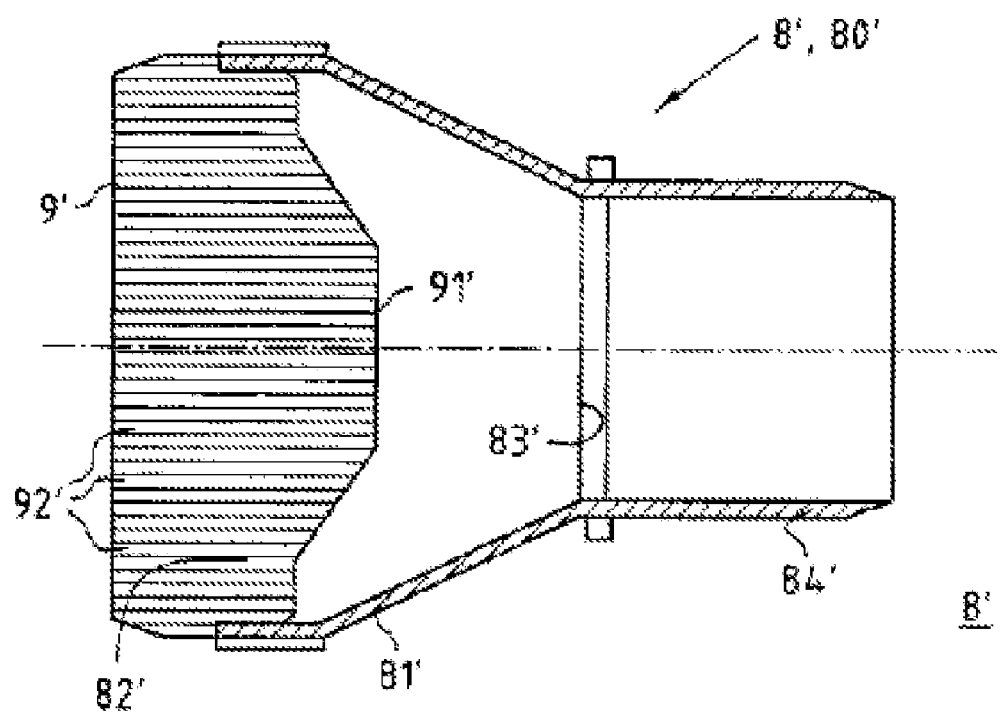

| | | | |
|---|---|---|---|
| 6,003,508 A | 12/1999 | Hoffschmidt et al. | |
| 6,066,187 A * | 5/2000 | Jensen et al. | 48/85 |

FOREIGN PATENT DOCUMENTS

| | | |
|---|---|---|
| DE | 2244593 | 4/1974 |
| DE | 3046181 | 7/1982 |
| DE | 9016385 | 2/1991 |
| DE | 19740644 | 3/1999 |
| DE | 19744541 | 4/1999 |
| DE | 10232387 | 2/2004 |
| DE | 10257458 | 6/2004 |
| DE | 102005028863 | 1/2007 |
| DE | 102005055955 | 6/2007 |
| WO | 03/021161 | 3/2003 |
| WO | 2010/086430 | 8/2010 |

OTHER PUBLICATIONS

PCT International Search Report for PCT/EP2010/051181 filed on Feb. 1, 2010 in the name of Saint-Gobain Industriekeramik Rodental GmbH.

PCT Written Opinion for PCT/EP2010/051134 filed on Jan. 30, 2010 in the name of Saint-Gobain Industriekeramik Rodental GmbH (with English Translation).

PCT International Preliminary Report on Patentability for PCT/EP2010/051181 filed on Feb. 1, 2010 in the name of Saint-Gobain Industriekeramik Rodental GmbH (with English Translation).

PCT International Preliminary Report on Patentability for PCT/EP2010/051134 filed on Jan. 29, 2010 in the name of Saint-Gobain Industriekeramik Rodental GmbH (with English Translation).

PCT Written Opinion for PCT/EP2010/051181 filed on Feb. 1, 2010 in the name of Saint-Gobain Industriekeramik Rodental GmbH (with English Translation).

Fend, T., et al., Solar Radiation Conversion, in Cellular Ceramics: Structure, Manufacturing Properties and Applications, Wiley-VCH Verlag GmbH & Co. KGaA, Weinheim 2005, pp. 523-547.

Translation of German Office Action issued for DE 10 2009 006 952.6 filed on Jan. 30, 2009 in the name of Saint-Gobain Industriekeramik Rodental GmbH.

* cited by examiner

SOLAR ABSORBER MODULE AND SOLAR ABSORBER ARRANGEMENT

CROSS REFERENCE TO RELATED APPLICATIONS

The present application is the US national stage of International Application PCT/EP2010/051181 filed on Feb. 1, 2010, which in turn, claims priority to German Patent Application No. 10 2009 006 952.6 filed on Jan. 30, 2009.

The invention relates to a solar absorber module comprising a housing with a longitudinal axis with a first tapered housing section with a first, free end, and a second end with a reduced cross-sectional area compared to the first end, and with a second housing section adjoining the second end of the first housing section with a substantially constant cross-section over its length, and a ceramic solar absorber element accommodated in the first end of the first housing section with a first surface that can be oriented toward the solar radiation with an axis of symmetry and a second surface lying across from the first surface, wherein the solar absorber has a large number of substantially straight channels connecting the first surface to the second surface. The invention further relates to a method for production of a housing for a solar absorber module as well as the solar absorber arrangement.

Solar thermal power plants are power plants in which the energy of sunlight obtained via absorbers is utilized as heat. So-called "solar tower power plants" are a particular form of solar thermal power plants that are mostly steam power plants with solar steam generation.

One solar tower power plant known from the prior art comprises a solar absorber arrangement—also called a solar receiver—arranged on a tower, inclined downward by approx. 25°, which solar absorber arrangement, for its part, comprises a large number of solar absorber modules that are held on a common support structure. The solar absorber arrangement is irradiated by a large number of automatically orienting minors (heliostats) with solar radiation reflected by the minors such that it is struck—depending on the number of mirrors used—by 200 to 1000 times the normal radiation intensity.

In the operation of the solar tower power plant, ambient air is sucked through the individual absorber elements of the solar absorber arrangement into the interior of the solar absorber module and heated to a temperature of approx. 700° C. The air thus heated flows through a conduit system into a heat exchanger, where it gives off its heat to a water-steam circuit for the purpose of steam generation. The steam produced in the heat exchanger then drives, in a manner known per se, a steam turbine connected to a generator. The air cooled in the heat exchanger to approx. 150° C. then flows back to the solar absorber arrangement and is there given off back into the environment, flowing through the intermediate spaces formed between the individual solar absorber modules and, in the process, cooling the connecting tubes of the steel structure of the individual solar absorber modules. Here, it has proved to be disadvantageous that the double walled structure of the metallic mounting tubes of the supporting structure, with which the interior tube that accommodates the absorber module can only be welded on at the rear end. As a result of the thermocycling stress during operation, the support structure can warp, causing the gap width between the absorber modules to be disadvantageously altered.

In the case of solar tower power plants of the type described above, it has proved to be problematic that too much of the highly concentrated sunlight beamed onto the solar absorber arrangement by the heliostats cannot be utilized since it falls not on the active absorber surface, but rather, for example, into the intermediate spaces between the solar absorber modules out of which the air cooled in the power plant is discharged or onto the housing of the module.

Based on this, the object of the invention is to provide an improved solar absorber module and an improved solar absorber arrangement that are distinguished by optimized absorption of solar radiation, reduced heat losses and, consequently, by optimized efficiency in the energy conversion in a connected power plant.

The object is accomplished according to a first teaching of the invention with a solar absorber module according to the generic portion of claim 1 in that the solar absorber element is accommodated in the first end of the first housing section such that the axis of symmetry of the first surface is arranged inclined relative to the longitudinal axis of the housing.

By means of the inclined arrangement of the absorber elements inside the first housing section of the housing, it is possible to orient all absorber modules optimally toward the solar radiation directed by the heliostats to the solar absorber arrangement formed from the individual absorber modules and to simultaneously minimize losses. Due to the fact that the individual absorber elements are oriented at an incline— to the heliostat array—in each case, they can now be integrated in a substantially vertically oriented solar absorber arrangement. This in turn enables, for engineering reasons, larger solar receivers and, consequently, more efficient power plants. The inclination of the individual absorber members in the housings whose respective longitudinal axis is then oriented substantially horizontally, causes, in the case of an individual solar absorber module for certain steep angles of incidence of radiation of heliostats near receivers, a slight shadowing of the region above the associated solar absorber element. This reduces, in particular, the losses that occur in known solar absorber arrangements due to inevitable irradiation of the air discharge gaps or the exterior wall of the solar absorber modules. Investigations by the applicant have demonstrated that, with this, an efficiency gain of approx. 4-5% can be obtained.

A particularly effective increase in efficiency can be obtained with an angle of inclination of 5°-20°, preferably 12.5°.

The ceramic solar absorber element preferably comprises a ceramic monolith with a large number of substantially straight channels passing through it. According to an advantageous embodiment of the invention, the first surface of the solar absorber element is configured substantially flat, with the axis of symmetry coinciding with the normal of the first surface. Such flat geometries are comparatively simple to manufacture and thus cost-effectively available. Furthermore, a flat surface facing the solar radiation enables efficient coupling of the radiation into the solar absorber element and, consequently, efficient conversion of radiation energy into heat. In particular, the solar absorber element is configured as a flat component, in particular disk-shaped or cube-shaped, with the channels running substantially perpendicular to the planar length. For the purposes of the present invention, a "flat component" means a component whose length and width are substantially larger than its height. For the ceramic monolith configured as a flat component, this means here that that its length and width, which are substantially predetermined by the entry cross-section of the free end of the first housing section, are substantially larger than the height of the monolith that extends, in the installed state of the solar absorber element, accordingly inclined relative to the longitudinal axis of the housing.

The housing of the solar absorber module can be manufactured from various materials, with these having to be distinguished by high heat resistance, by thermocycling resistance, and, preferably, low thermal conductivity. Since the solar absorber element is usually a ceramic body, the housing is, in the context of uniform thermal expansion, likewise expediently produced from a ceramic material, in particular from silicon infiltrated silicon carbide (SiSiC) or nitride bound silicon carbide (NSiC). The use of cordierite is particularly preferred.

According to another advantageous embodiment of the invention, the channels connecting the first surface to the second surface of the solar absorber element have a polygonal cross-section. Comparatively simple and cost-effective production is possible with simple square channel cross-sections. Hexagonal cross-sections have proved to be particularly effective with regard to efficient absorption of solar radiation. As investigations of the applicant have demonstrated, they enable, compared to square cross-sections, an enlargement of the heat exchange surface area of 15% with an identical hydraulic diameter and an opening cross-section of equal area.

According to another embodiment of the invention, the inner wall of the second housing section is provided with an insulating lining. This effectively thermally separates the fluid stream flowing through the second housing section and previously heated intensely while flowing through the absorber member from the wall of the second housing section. This has, in particular, the positive effect that heat transfer from the housing to the usually steel support structure of a solar absorber arrangement is minimized. Such heat transfer results, above a certain temperature level, in a no longer adequate stability of the support structure of the solar absorber arrangement.

Advantageously, the insulating lining extends into the first housing section, wherein it lies flat against the wall of the first tapered housing section. Thus, a further improved thermal separation between the housing of the solar module and the support structure of a solar absorber arrangement is obtained, with the fluid stream virtually unimpeded.

It is also possible to coat the outer wall of the second housing with insulation. Obviously, further optimized insulation of the hot second housing section against the support structure is obtained.

To thermally separate the second housing section optimally from a tube section into which the housing of the solar absorber module is inserted with its second housing section, provision is made according to another embodiment of the invention that the second housing section has on its outer wall at least one spacer projection for centric mounting in a tube of a solar absorber arrangement. This ensures a uniform spacing of the outer wall of the second housing section from the surrounding inner wall of the tube such that no spot overheating of parts of a support structure can occur as a result of too small a spacing or even contact between the housing section and the supporting structure.

According to another particularly advantageous embodiment of the invention, the housing has, in the first tapered housing section, a wall extending over the entire internal cross-section of the first housing section and provided with a plurality of openings. The particular advantage of this embodiment consists in that the fluid—usually air—sucked into the housing through the solar absorber element, with appropriate distribution and dimensioning of the openings over the surface area of the wall, which can be determined simply through appropriate simulation calculations, can flow uniformly over the entire cross-section of the solar absorber element, i.e., even in its edge regions such that local temperature peaks are reliably avoided in the absorber module.

Preferably, the cross-section of the openings and/or the density of the openings per surface unit of the wall increases from the center of the wall to its edge. Thus, a possibility is opened to reduce the relative flow resistance to the edge in order to effectively prevent the fluid (air) flowing through the solar absorber element and being heated in the process preferably in the central region of the solar absorber element from being sucked in.

Another advantageous embodiment of the invention from the manufacturing standpoint consists in that the wall is curved concavely as viewed from the free end of the first housing section to facilitate demolding of the core of the solid cast part during production of the solar absorber housing made in particular from a ceramic material.

By providing a wall in the tapered first housing section, the housing of the solar absorber module according to the invention can be produced particularly favorably from a manufacturing standpoint in combined hollow casting and solid casting. In particular, this has the advantage that the first housing section produced in solid casting can be manufactured from its free end to the wall with tight tolerances without mechanical reworking, whereas the other housing sections can be produced conventionally in hollow casting. In another embodiment, the wall can also be produced separately, e.g., by water-jet cutting or milling of sheet material. The wall is then installed in the housing produced conventionally by hollow casting.

A significant criterion in the designing of the solar absorber module is to obtain a homogeneous flow profile over the entire cross-section of the solar absorber element for the fluid sucked in. For this, the distribution and/or the cross-section of the openings provided in the wall arranged in the first housing section of the housing is dimensioned such that a fluid stream flowing from the outside into the monolithic solar absorber element over its entire cross-section is guided uniformly into the second housing section with respect to individual surface area units on the absorber element.

Another teaching of the present invention relates to a method for production of a housing (80) for a solar absorber module (8) according to claim 17, which is characterized by the following process steps:

creating the housing in combined hollow casting and solid casting, with the region between the first free end of the first housing section and the wall created in solid casting and the region between the wall and the free end of the second section created in hollow casting, forming the openings in the unfired wall, and subsequent high temperature treatment.

The method enables the production of housings for solar absorber modules with particularly high precision and surface quality in the first housing section. In addition, what has already been stated above applies with regard to the advantages of the method.

In particular, the forming of the openings in the wall can be accomplished in a simple manner using CNC milling customary in the prior art.

Another aspect of the invention relates to a solar absorber arrangement with a support structure for a plurality of solar absorber modules according to one of claims 1 through 17.

The support structure can, for example, have a number of double walled pipe sockets inset in the supporting structure, in which the respective second housing sections of the housing of the solar absorber module are accommodated.

Alternatively, the support structure can have a front face with an arrangement of first openings and second openings surrounding the first openings, with single walled mounting tubes provided in the support structure to accommodate the housing of the solar absorber modules, which can be welded on both sides to increase stability. The solar absorber modules are accommodated in the first openings, which, at the same time, are the front ends of the single walled mounting tubes. The second openings are configured for discharge of the cooled fluid that flows back. The second openings preferably form a connection between collector boxes arranged behind the front faces and between the second housing sections of the individual solar absorber modules, into which the cooled returned fluid stream flows, and the environment, into which the fluid—usually air—flows out of the collector boxes.

Preferably, the second openings are configured as vertical and/or horizontal slits and/or circular openings. The advantage relative to the double walled mounting tubes, through whose respective annular channels the returned fluid must flow into the environment, is a larger opening cross-section which enables a slowing of the fluid flow. Such a slowing in turn enables a larger portion of the fluid flowing out to be able to be sucked back in through the absorber elements, as a result of which the energy losses from no longer usable exhaust heat can be reduced.

Figure 2:
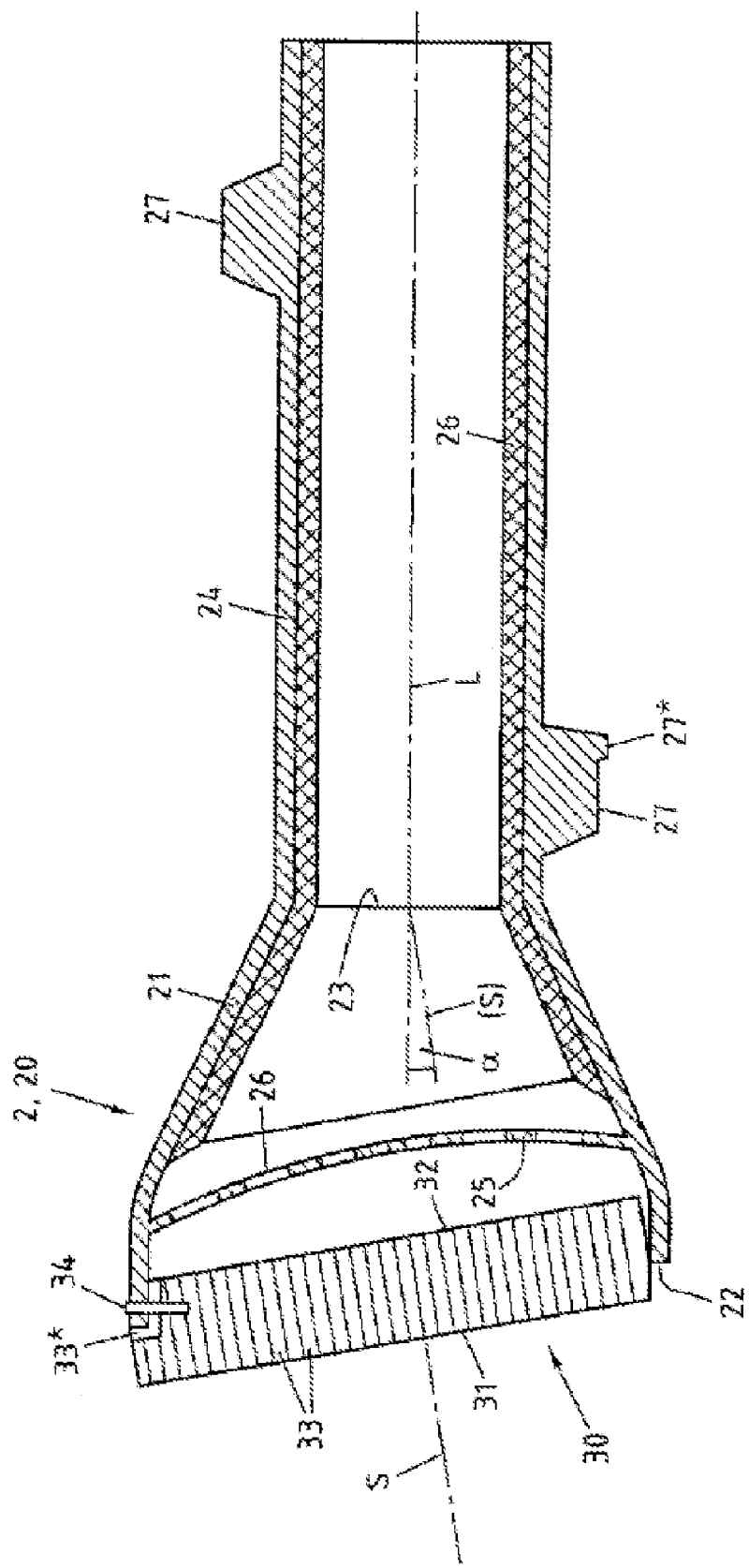
Figure 3:
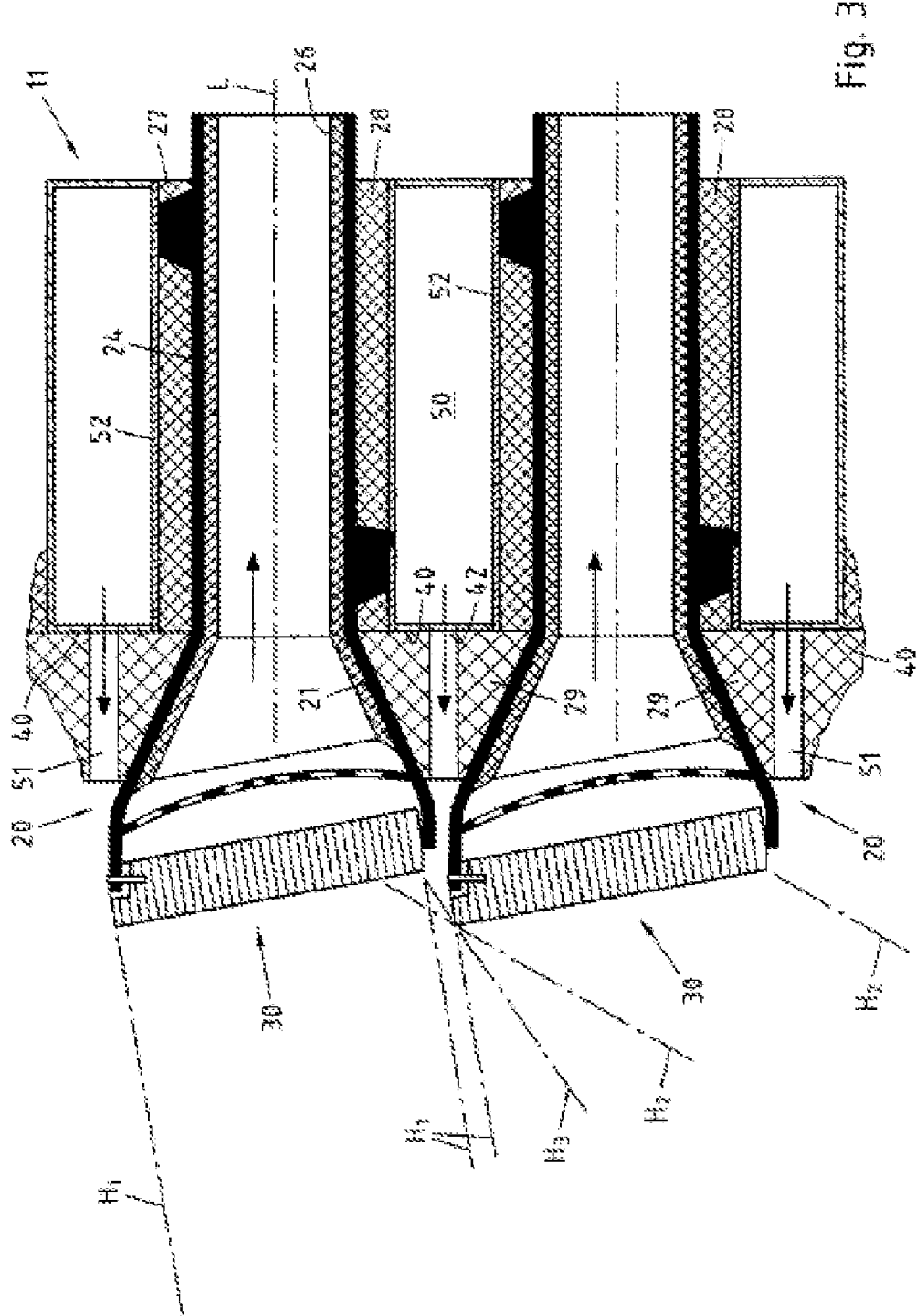
Figure 4:
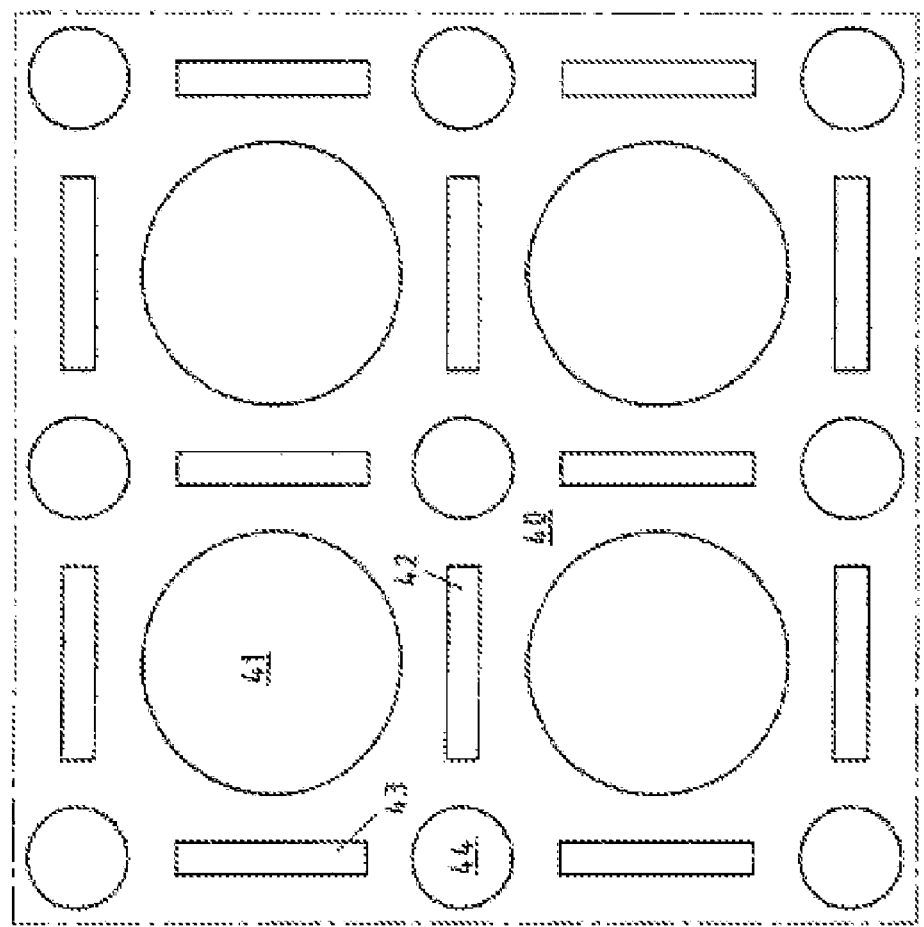
Figure 5:
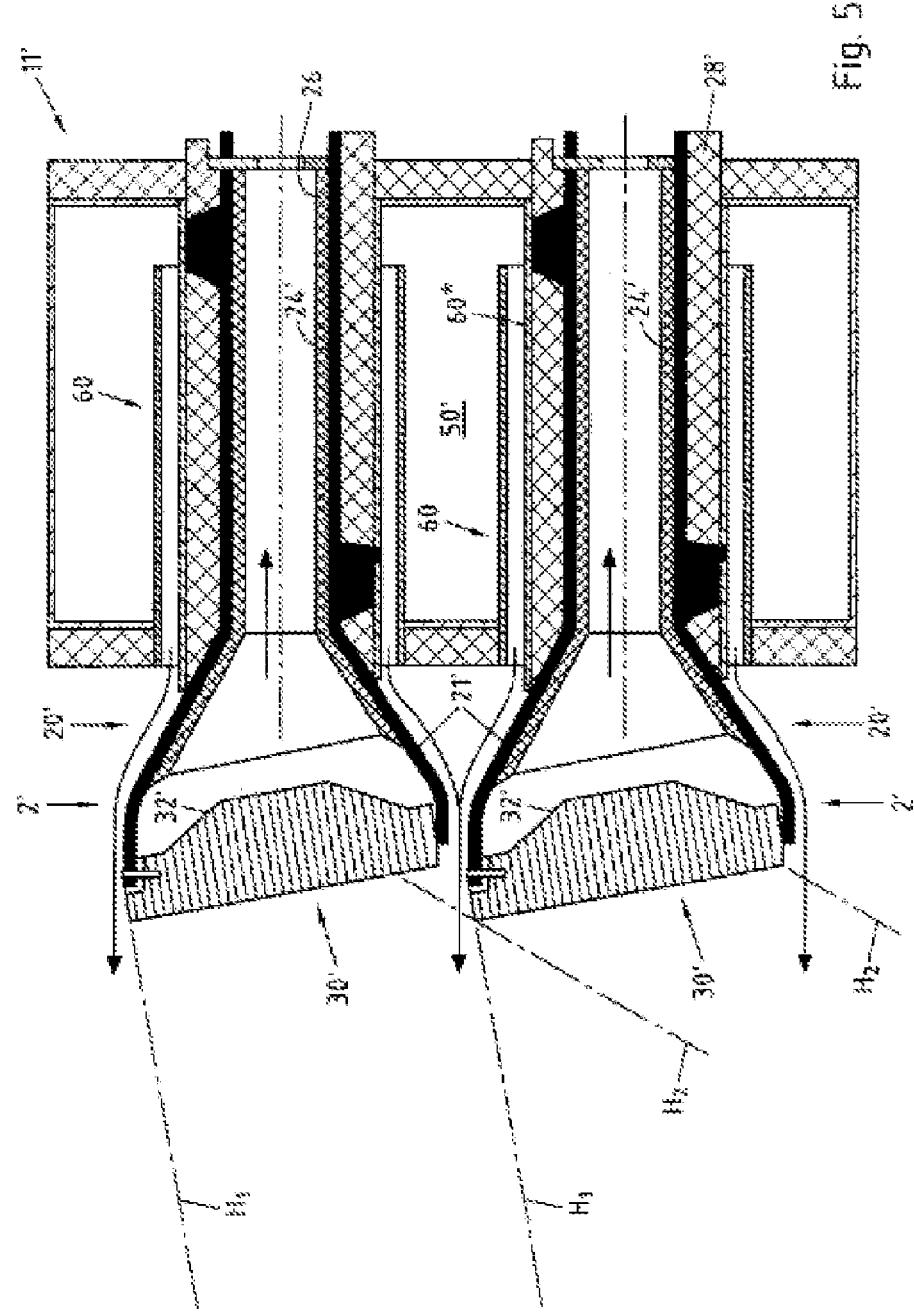
Figure 6:
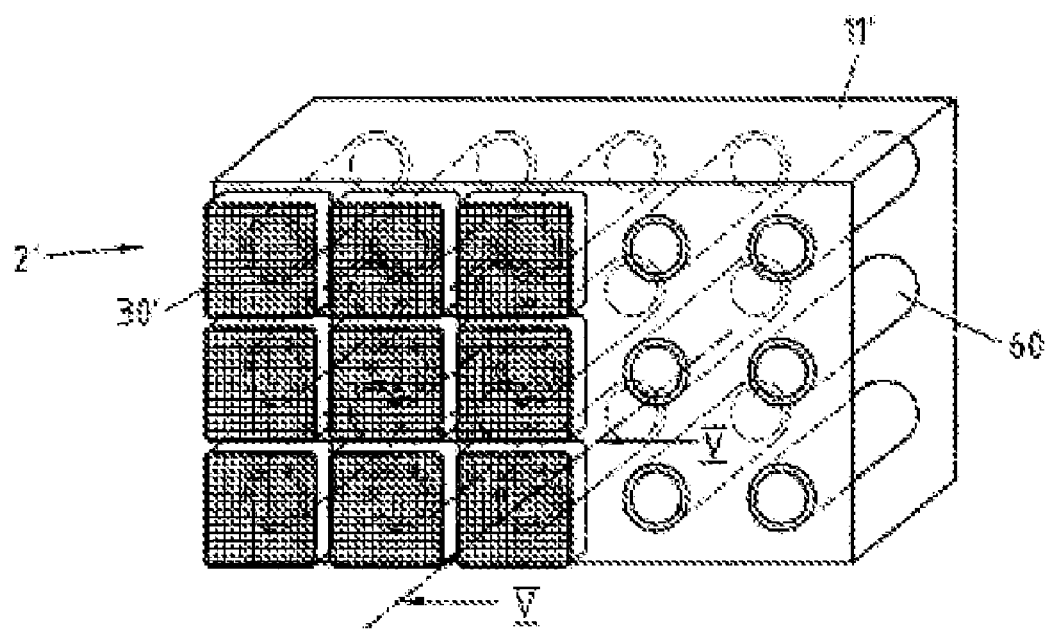
Figure 7:
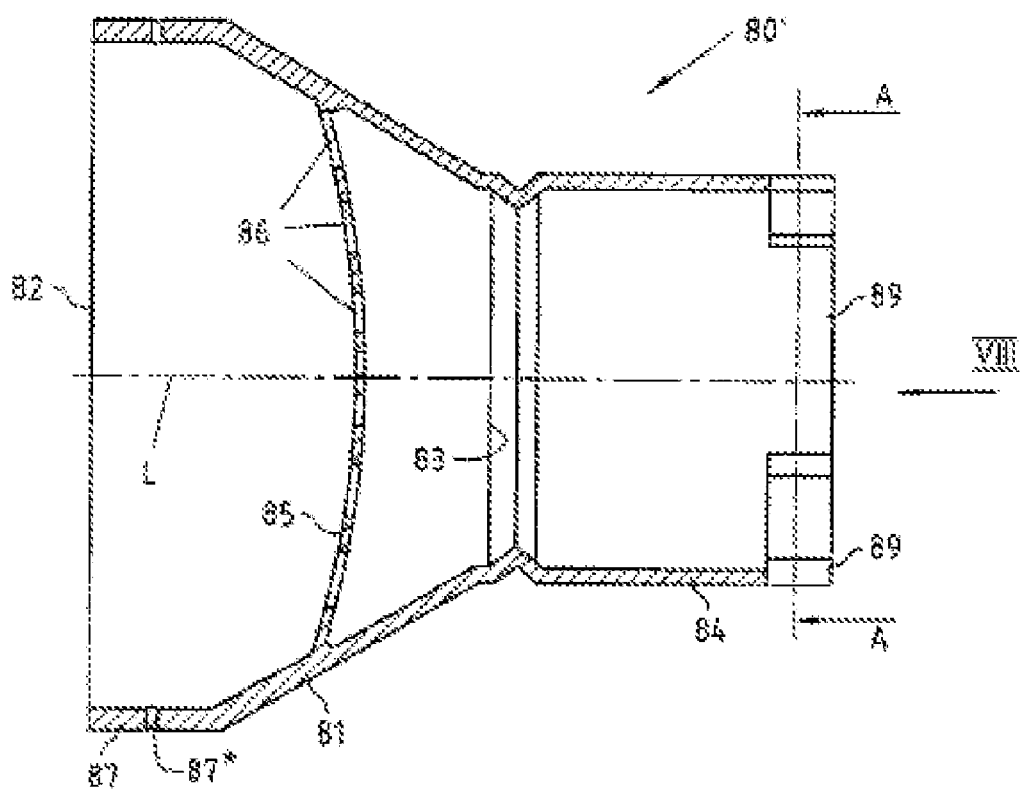
Figure 8:
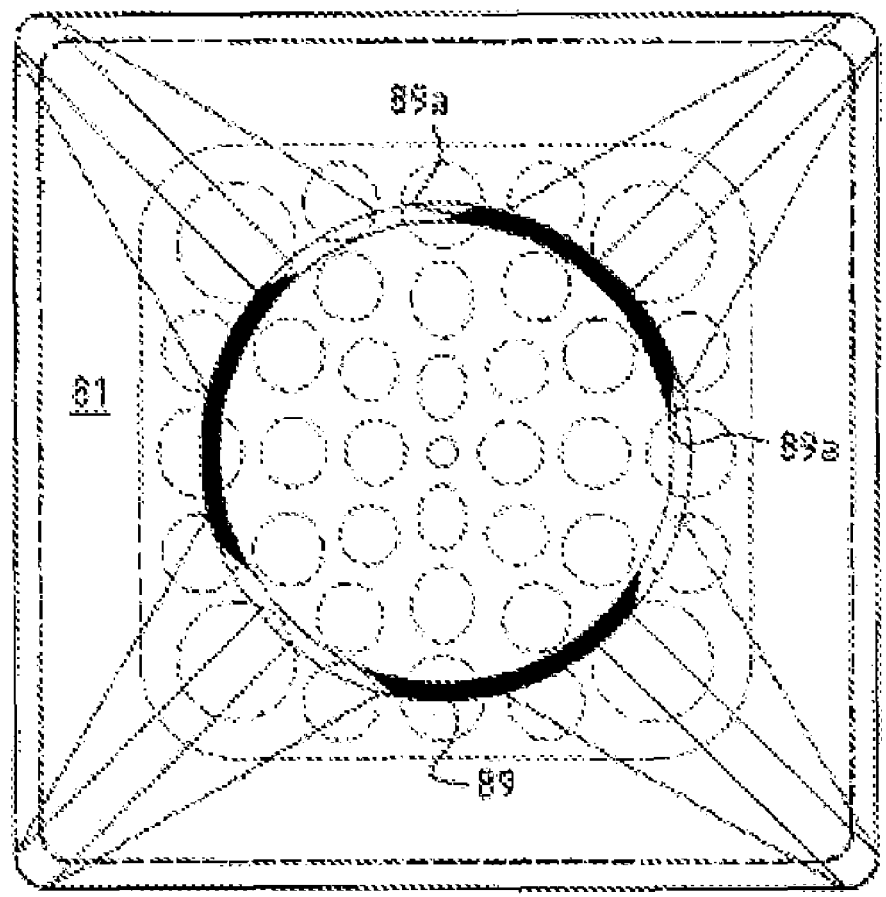
Figure 9:
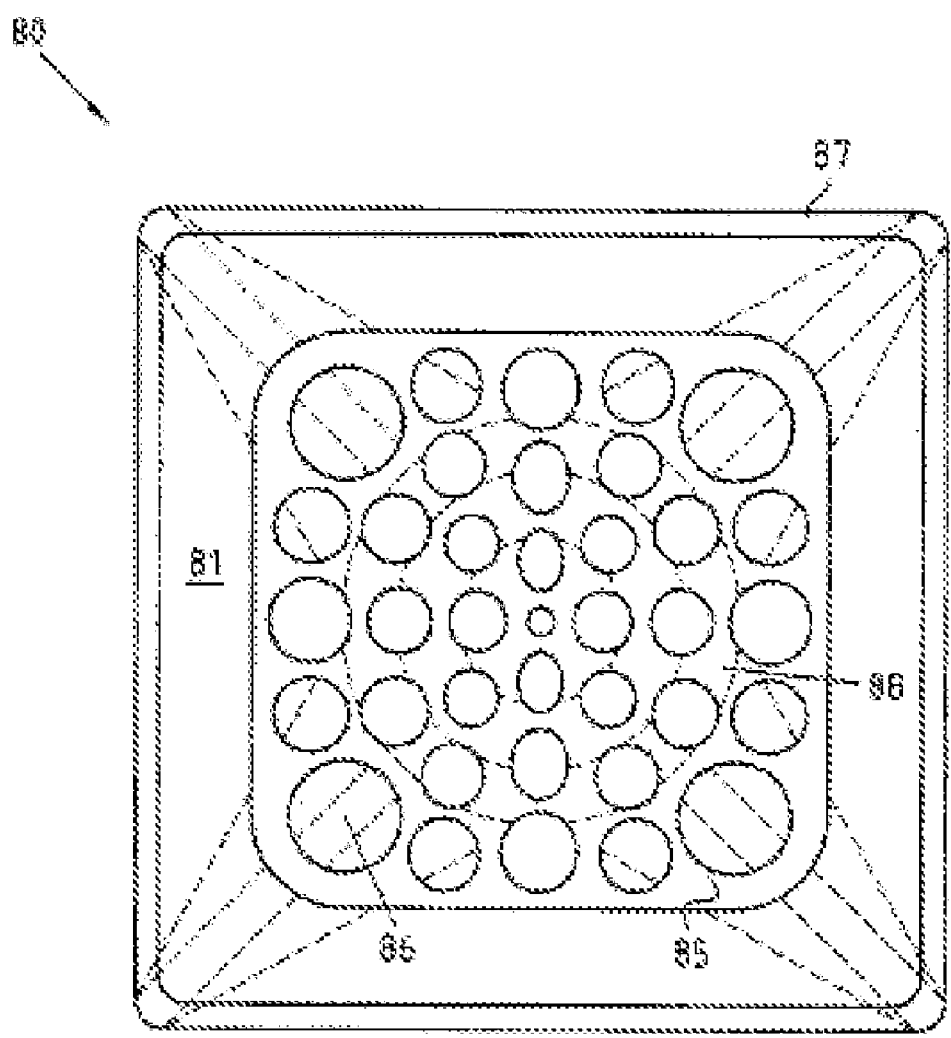
Figure 10:
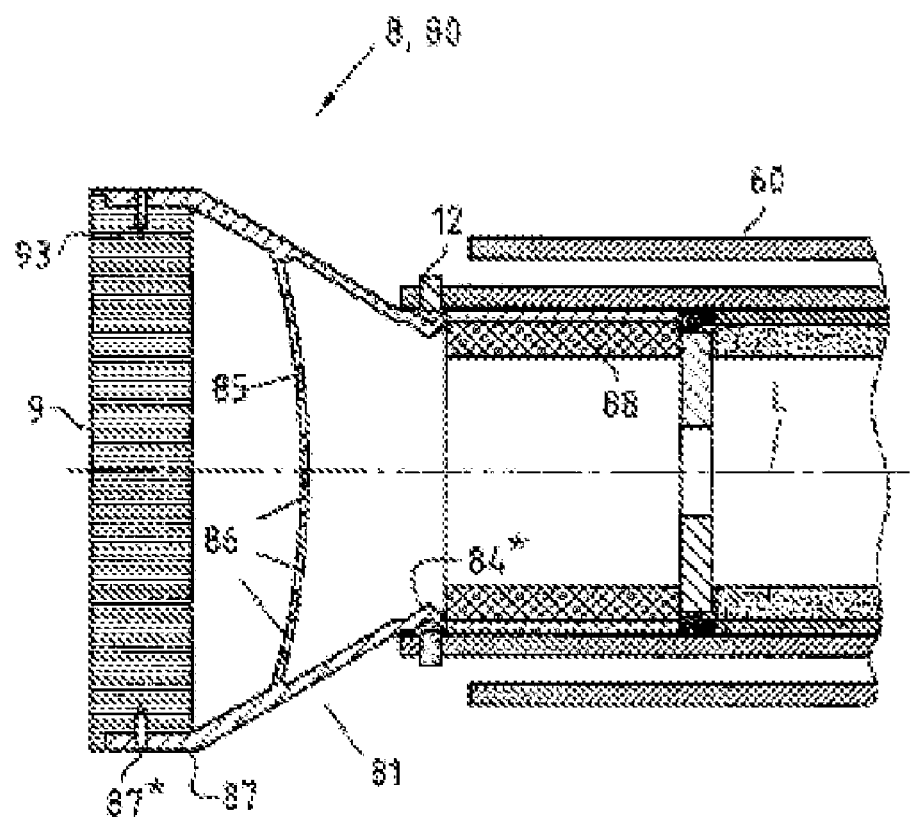

In the following, the invention is explained in detail with reference to drawings depicting an exemplary embodiment. They depict:

FIG. 1 a solar absorber module according to the prior art, in longitudinal section, FIG. 2 a housing for a solar absorber module in a first embodiment, in longitudinal section, FIG. 3 a solar absorber arrangement with two solar absorber modules arranged one over the other, each with a housing according to FIG. 2, in vertical section, FIG. 4 the front face of the solar absorber arrangement according to FIG. 4 [sic], FIG. 5 a solar absorber arrangement modified compared to FIG. 3 according to cutting line V-V in FIG. 6, FIG. 6 a solar absorber arrangement with a support structure and a plurality of solar absorber modules according to FIG. 5, FIG. 7 a housing for a solar absorber module according to the third embodiment, in longitudinal section, FIG. 8 the housing from FIG. 7 in a view rotated by 90° (back view), FIG. 9 the housing for a solar absorber module from FIG. 8, in a front view, FIG. 10 a solar absorber module with the housing from FIG. 9 in the installed state, in longitudinal section, and FIG. IIa, b the steps of a method for fastening a housing for a solar absorber module in a support structure.

As depicted in FIG. 1, a known prior art solar absorber module 8' comprises a housing 80' with a longitudinal axis L, which, for its part, comprises a first tapered housing section 81' with a first free end 82' and a second end 83' with a reduced cross-section compared to the first end 82' as well as a second housing action 84' with a substantially constant cross-section. As can further be seen in FIG. 1, the second housing section 84' connects directly to the second end 83' of the first housing section 83' [sic], such that the housing 80' has, overall, a funnel shape.

A solar absorber element 9', configured here substantially in the shape of a cube and having a truncated pyramid 91' on its surface pointing into the inside of the housing 80', is accommodated in the free end 82' of the first housing section 81'.

The solar absorber element 9' made from a ceramic material, preferably SiC or silicon infiltrated SiC, is configured with a large number of channels 92' arranged adjacent and on top of each other that connect the two surfaces of the solar absorber element 9' to each other and are oriented perpendicular to the surface or parallel to the longitudinal axis of the solar absorber module 8'. The truncated pyramid 91' arranged in the interior of the housing 80' of the solar absorber module 8' serves to lengthen the centrally arranged channels 92' of the solar absorber element 9', in order to slow down the fluid—in this case, air—flowing centrally through the solar absorber element 9' such that a uniform flow profile develops over the entire cross-section of the solar absorber element 9', which prevents temperature peaks in the edge region. The disadvantage of a solar absorber element 9' shaped thus is that no truly uniform flow distribution is obtained, as well as the high weight which requires reinforced steel structures. Moreover, the surface quality of the inner surface of the housing section 81', which is conventionally made of ceramic material produced in hollow casting, has proven to be unsatisfactory.

The second housing section 84' of the housing 80' of the known solar absorber module 8' is inset, for installation of the solar absorber module 8' on a support structure (not shown) in the interior tube of a double walled pipe socket as part of the support structure (analogous to FIGS. 2 and 9). The air sucked through the solar absorber element 9' and thereby intensely heated now flows through the pipe sockets into a collector, from where it is routed in the direction of the heat exchanger of a solar thermal power plant. The returned cool air flows through the annular channel between an inner and an outer pipe of the pipe socket 10 and further to the outer surface of the tapered first housing section 81', whereby it cools the entire housing 80'.

FIG. 2 depicts, in longitudinal section, a solar absorber module 2 modified relative to the solar absorber module 8' known from the prior art. The solar absorber module 2 has a housing 20 with a longitudinal axis L, which, for its part, has a first tapered housing section 21 with a first free end 22 and a second end 23 with a reduced cross-sectional area compared to the first end 22 and a second housing section 24 adjoining the second end 23 of the first housing section 21 with a substantially constant cross-section over its length. The cross-section of the first housing section 21 is circular on its second end 23, with the square cross-section on the first end 22 transitioning continuously into the circular cross-section on the second end 23.

In the free end 22 of the first housing section 21 of the housing 20, a solar absorber element 30 is again accommodated. Since the housing 20 is provided with a wall 25 in the region of the first housing section 21, as is explained in further detail below, the solar absorber element 30 can be configured as a purely cube-shaped flat component dispensing with the inner truncated pyramid and is thus substantially lighter than the absorber element of FIG. 1.

The solar absorber element 30, for its part, has a first surface 31 that can be oriented toward the solar radiation with an axis of symmetry S and a second surface 32 lying across from the first surface 31, with the solar absorber element 30 having a large number of substantially straight channels 33 connecting the first surface 31 to the second surface 32.

The channels 33 have, preferably, a hexagonal, i.e., honeycomb-shaped cross-section. This makes it possible to obtain a surface increase of 15% with an identical hydraulic diameter and the same entry cross-sectional area.

As can be seen in FIG. 2, the solar absorber element 30 is accommodated in the first end 22 of the first housing section 21 such that the axis of symmetry S of the first surface 31 is arranged inclined relative to the longitudinal axis L of the housing 20. Since the first surface 31 of the solar absorber module 30 is configured substantially flat, here, the normal of the surface coincides with the axis of symmetry. The axis of symmetry S encloses an angle α with the longitudinal axis of preferably 5-20°, in the present case 12.5° (cf. the parallel shifted axis of symmetry (S) in FIG. 2).

By means of the inclined arrangement of the absorber elements inside the first housing section 21 of the housing 20, it is possible to orient all solar absorber modules 2 optimally toward the solar radiation directed by the heliostats to the solar absorber arrangement formed from the individual solar absorber modules 2 and to simultaneously minimize losses. These losses occur in the solar absorber arrangements known from the prior art in particular through the inevitable irradiation of the air discharge gaps or the exterior wall of the solar absorber modules, as is explained in further detail in connection with FIG. 3. Investigations by the applicant have demonstrated that by means of the inclined arrangement of the solar absorber elements 30 in the respective housings 20 of the solar absorber module 2, an efficiency gain of approx. 4-5% can be obtained.

As further emerges from FIG. 2, the top two channels 33 of the solar absorber element 30 are connected to an L-shaped channel 33*, such that the air flowing in there can be introduced into the absorber housing 20 and, thus, even these channels are available for the heating of the stream of air.

To fix the solar absorber element 30 in the free end 22 of the housing 20, locking pins 34 are inserted through openings provided in the free end 22.

In the second housing section 24 of the housing 20, a sleeve 26 made of insulating material that thermally separates the stream of air heated in the absorber element 30 from the wall is provided to line the inner wall of the second housing section 24. As can be seen, the insulation extends into the first housing section such that further improved insulation is achieved. Furthermore, the second housing section 24 has on its outer wall three spacer projections 27 (only two are discernible in the longitudinal section) for centric mounting in a tube in the support structure of a solar absorber arrangement.

A wall 25, extending in its lengthwise direction over the entire internal cross-section of the first housing section 21 and provided with a plurality of openings, is arranged in the first housing section 21. As emerges in particular from FIG. 9, which depicts a housing for a solar absorber module with comparable geometry with regard to the wall 25, the cross-section of the openings 26 in the wall 25 increases from the center of the surface of the wall to its edge. It is also possible that the density of the openings per surface unit of the wall increases from the center of the wall to its edge. The result here is that the flow resistance is reduced from the center of the surface 25 to its edge. This effectively prevents the air flowing through the solar absorber element from flowing in the central region with clearly higher flow speed, with the result that heat buildup occurs in the edge regions. Thus, a uniform flow profile is obtained over the entire cross-section of the solar absorber element 30, without requiring an increase in volume of the solar absorber element 30 for this. As further emerges from FIG. 2, the wall 25 can also be configured concavely curved relative to the free end 22 of the first housing section 21 with correspondingly easier demolding during production.

If the housing 20 is made from a ceramic material, as will be the case in the overwhelming majority of applicational cases because of the high temperature resistance of ceramic materials, such as, for example, SiC, the openings 26 can be made in the wall 25 after production of the housing 20, for example, in combined hollow and solid casting by CNC milling.

FIG. 3 depicts a solar absorber arrangement with two solar absorber modules 2, each with a housing 20 according to FIG. 2, in vertical section. The solar absorber arrangement includes a support structure 11 made of steel, which is depicted only partially here. The support structure 11 encloses an air collection zone 50 that serves to return the air cooled in the solar thermal power plant, which air, for its part, cools the support structure 11. The air collection zone 50 is passed through by a number of single walled mounting tubes 52, in which the housings 20 of the solar absorber modules 2 are accommodated. The mounting tubes 52 are welded on both of their ends to the support structure 11, which simplifies the structural design of the support structure 11 overall and at the same time significantly increases stability, with the result that the width of the airflow gaps between the absorber modules remains stable under thermocycling stress. The support structure 11 further includes a single front face 40 that is provided with a plurality of openings (cf. FIG. 4), through which the return air can pass out of the solar absorber arrangement into the environment.

It is known that with solar receivers known from the prior art that the stability of the steel support structure 11 is negatively affected by the high temperatures of the stream of air that appear, with the support structure 11, on the housing due to thermal conduction and from there on the support structure 11. Consequently, in order to also achieve optimal thermal separation between the hot stream of air and the support structure 11 of the solar absorber arrangement (solar receiver), the best possible installation of the individual solar absorber modules 2 is striven for in the support structure 11. This is accomplished in the present case, on the one hand, by the already described insulating inner lining 26 of the second housing section 24. In addition, with the solar absorber arrangement of FIG. 3, outer insulation 28 surrounding the outer wall of the second housing section 24 is also provided. As already mentioned, to ensure centric alignment of the second housing section 24 inside the respective mounting tube 52, a total of three spacer projections 27 are provided on the outer wall of the second housing section 24, of which the bottom two (only one visible) have in each case a further protuberance 27*, with which can snap into a corresponding opening in the mounting tube 52 for correct and reliable longitudinal positioning.

And finally, still more insulating bodies 29 are provided in the solar absorber arrangement of FIG. 3, by means of which the outer wall of the respective first housing section 21 of the housing 20 of the solar absorber module 2 is insulated. This is a specially cured insulation material. Between respective adjacent insulating bodies 29, a channel 51 is opened in extension of the openings of the air collection zone 50, through which the cooled air flows into the environment and is partially sucked back into the solar absorber module 2 to be heated again in the solar absorber body 30.

As mentioned above, the absorber bodies 30 are aligned inclined relative to the longitudinal axis L of the absorber housing 20. The inclination is oriented to the alignment of the heliostats in the heliostat array that directs light to the solar absorber arrangement. In a solar tower power plant, in which the present solar absorber arrangement is installed, the most distant heliostats project their light in a flat angle of approx. 10° onto the absorber body 30, as indicated by the dot-dash lines $H_1$. In contrast, the light from the nearest heliostats is projected at a considerably larger angle (approx. 60°) onto the absorber body 30, as indicated by the lines $H_2$. In this, the gap between the respective solar absorber modules 2 arranged adjacently one over another is shadowed by the protruding upper edge of each absorber body 30 such that the particularly intensive light of the heliostats near the tower is projected completely onto the absorber bodies 30 and is thus unrestrictedly available for the heating of the stream of air and thus for the recovery of energy. The line H₃ describes an angle of incidence of approx. 35°, at which the light is beamed onto the absorber body 30 precisely such that the non-utilizable gap region is left out, but each solar absorber body 30 is fully illuminated. This light incidence direction is obtained with heliostats at medium distance from the solar absorber arrangement.

FIG. 4 depicts the front face 40 of the solar absorber arrangement. This has large circular openings 41 of the mounting tubes 52 arranged in a checkerboard pattern, in which tubes the second housing sections 24 of the solar modules 2 are accommodated. The front face 40 also includes horizontal slits 42 as well as vertical slits 43 that surround the openings 41. And finally, the front face 40 includes even smaller round openings 44. Since with the openings 42, 43, 44 altogether, a comparatively large discharge cross-section is available, the returned cooled air can escape with a comparatively low flow speed such that a large part (approx. 80%) of the air flowing out, whose temperature level is still clearly above that of the ambient air, can be sucked back in. Moreover, the overall proportion of the air returned can be reduced since the cooling requirement of the support structure 11 is reduced as a result of the optimized insulation, as a result of which the flow speed is further reduced and a larger proportion of the return air can be reused.

FIG. 5 depicts a solar absorber arrangement modified compared to FIG. 3. Here, the solar absorber modules 2' are altered compared to the solar absorber modules 2 of FIG. 3 to the effect that the cross-section of the respective second housing section 24' is somewhat reduced. This correlates with the altered accommodation of the solar absorber module 2' with double walled mounting tubes 60 in the support structure 11' of the solar absorber arrangement. The housing 20' of the solar absorber module 2' of FIG. 5 also has in each case inner insulation and outer insulation, as a result of which effective thermal separation between the housing 20' and the support structure 11' is ensured.

The support structure 11' of the solar absorber arrangement of FIG. 5 again includes an air collection zone 50' as well as, as mentioned, double walled pipe sockets 60, which, for their part, accommodate the second housing sections 24'. The returned cooled air can escape during operation through the annular gap formed in the double walled pipe sockets 60, as depicted by corresponding arrows in FIG. 5, and, in the process, simultaneously cools the support structure 11'. However, because of the smaller cross-sectional area of the annular gaps, higher flow speeds are required here than with the solar absorber arrangement of FIG. 3, such that here the proportion of air that can be sucked back into the solar absorber module 2' is accordingly smaller. However, through the effective insulation of the housing 20' compared to the inner mounting tube 60* of the corresponding double walled mounting tube 60 of the support structure 11', the overall amount of air required for cooling and, with it, the flow speed can be reduced.

As also emerges from FIG. 5, no wall with a pattern of openings is provided in the first housing sections 21' of the housing 20' of the solar absorber module 2' such that the equalization of the air flow through the housing 20' must be accomplished by means of a corresponding shaping of the solar absorber elements 30' with a truncated pyramid 32'.

FIG. 6 depicts a solar absorber arrangement with a support structure 11' with double walled mounting tubes 60 with a large number (for example, 3×9) of solar absorber modules 2' that are arranged matrix-like adjacent and above each other.

FIG. 7 depicts another housing 80 for a solar absorber module. It again includes a first tapered housing section 81, with a first free end 82 with a square cross-section (cf. FIGS. 8 and 9) to accommodate a solar absorber element (not shown) and a second end 83 with a reduced cross-sectional area compared to the first end. The solar absorber element can be inserted in the manner depicted in FIG. 1, i.e., with the normal of it surface corresponding to the axis of symmetry colinear with the longitudinal axis L of the housing 84 inclined relative to the longitudinal axis L into the free end 82 of the first housing section 81.

The cross-section of the first housing section 81 is circular on its second end 83, with the square cross-section on the first end 82 transitioning substantially continuously to the circular cross-section on the second end 83. On its first free end 82, the first housing section 81 here has an additional edge section 87 with a constant diameter. The housing 80 further includes a second housing section 84 with a substantially constant cross-section over its length. Again, the second housing section 84 connects to the second end 83 of the first housing section 81.

A wall 85 provided with a plurality of openings 86 extending in its lengthwise direction over the entire internal cross-section of the first housing section 81 is also arranged in the first housing section 81. As emerges in particular from FIG. 9, the cross-section of the openings 86 in the wall 85 increases from the center of the surface of the wall to its edge. It is also possible that the density of the openings per surface unit of the wall increases from the center of the surface of the wall to its edge. The result here is that the flow resistance is reduced from the center of the surface 85 to its edge. This effectively prevents the air flowing through the solar absorber element 9 from flowing in the central region with clearly higher flow speed, such that heat buildup occurs in the edge regions. Thus, a uniform flow profile is obtained over the entire cross-section of the solar absorber element without requiring an increase in volume of these solar absorber element for this. As further emerges from FIG. 2, the wall 85 can also be configured concavely curved relative to the free end 82 of the first housing section 81 with correspondingly easier demolding during production.

If the housing 80 is made from a ceramic material, as will be the case in the overwhelming majority of applicational cases because of the high temperature resistance of ceramic materials, such as, for example, SiC, the openings 86 can be made in the wall 85 after production of the housing 80, for example, in combined hollow and solid casting by CNC milling.

FIG. 8 depicts the housing 80 from FIG. 2 in a view rotated by 90° and thus in the back view. Discernible are protuberances 89 with their bilateral tapered edges 89a that facilitate the spreading apart of a securing clamp, as is explained in greater detail in conjunction with FIG. 11.

FIG. 9 depicts a front view of the wall 85 arranged in the first housing section 81 of the housing 80. As can be clearly seen in FIG. 9, the cross-section of the openings 86 increases from the center of the surface of the wall to its edge. The specifically selected pattern of openings that serves to equalize the flow profile over the entire cross-section of the absorber element can be determined, for example, by means of simulation calculations.

FIG. 10 depicts the solar absorber module 8 in the installed state in the support structure 11' of a solar receiver of a solar tower power plant, with only the double walled pipe socket 60 of the support structure 11' depicted, which socket is welded only on the rear end (not shown). A solar absorber element 9 is again accommodated in the free end 82 of the first housing section 81 of the housing 80. In the present case, the solar absorber element 9 is aligned with its normal (corresponds to the axis of symmetry) colinear with the longitudinal axis of the housing 80. Since the housing 80 is provided with a wall 85 in the region of the first housing section 81, the solar absorber element can be configured purely cube shaped, dispensing with the inner truncated pyramid, and is thus substantially lighter.

To fix the solar absorber element 9 on the edge section with a constant cross-sectional area 87, locking pins 93 are inserted through openings 87* provided in the edge section 87. The housing 80 of the solar absorber module 8, for its part, is secured in the inner pipe sockets 10 by means of a securing clamp 12 that engages in a circumferential groove 84* that is provided in the region of the end of the second housing section 84 connected to the first housing section 81. The assembly of the housing 80 is explained in greater detail in connection with FIG. 11*a,b*.

In the second housing section 84 of the housing 80, a sleeve 88 made of insulating material that thermally separates the stream of air heated in the absorber element 9 from the double walled pipe socket 10 made of steel is also provided.

Figure 11A:
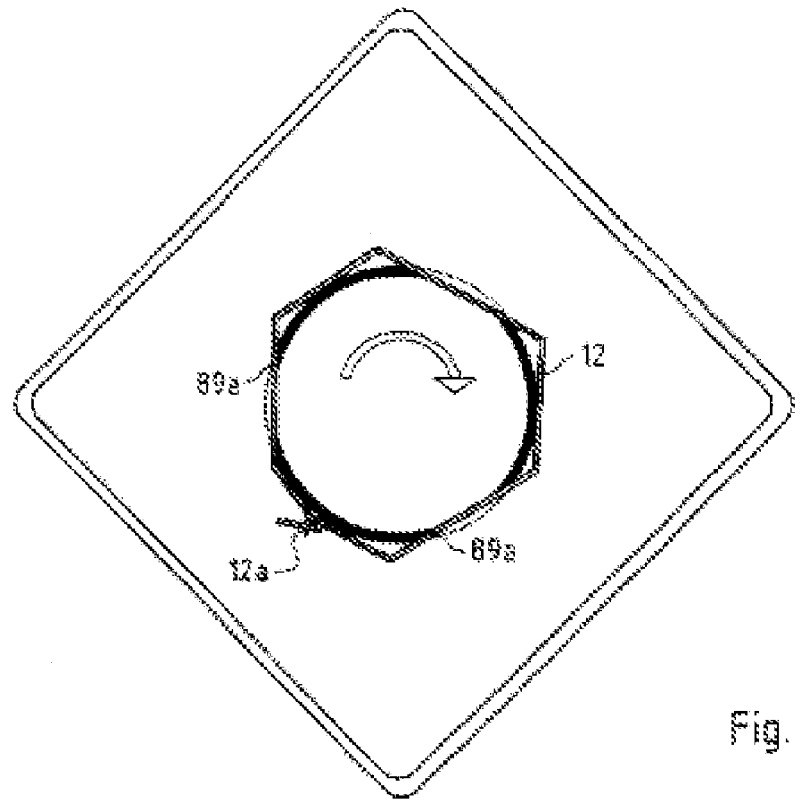
Figure 11B:
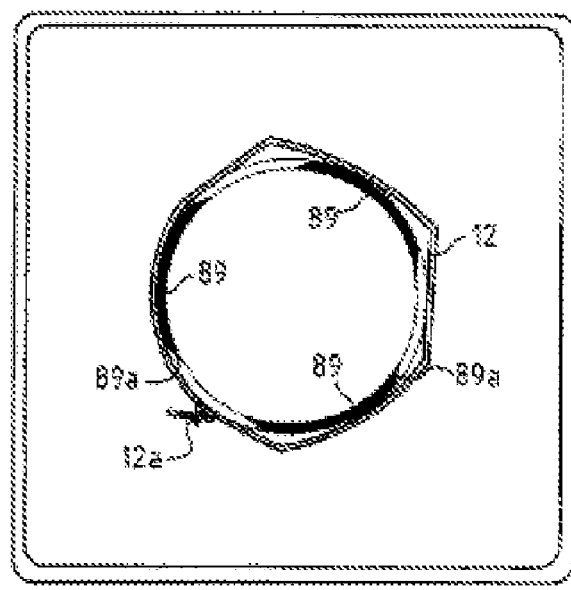

FIGS. 11*a* and 11*b* now depict, in a highly schematic view, a method for attaching the housing 80 on a pipe socket 10 of the support structure 11. Here, the housing 80 is again fixed on the pipe socket 10 by a surrounding polygonal securing clamp 12 closed by a lock 12*a*. As can be seen in FIGS. 7 and 8, the second housing section 84 of the housing 80 has on its free end in extension of the housing section 84 a plurality of protrusions 89 spaced relative to each other in the circumferential direction. For the introduction of the second housing section 84 into the pipe socket 60 and simultaneous spreading of the securing clamp 12 without excessive expenditure of effort, the housing 80 is introduced in an axially rotated state (e.g., rotated by 60°) into the securing clamp 12 such that the protrusions 89 are guided through the securing clamp 12 in the region of the opening defined by the securing clamp 12 without spreading it, which is accordingly possible without expenditure of effort. It is, of course, critical that the second housing section 84 is guided through the securing clamp 12 exclusively with the protruberances 89.

Then, the housing 80 is rotated into its definitive rotative position—for example, by 60°—with the protruberances 89 now resting against the individual sections of the securing clamp 12 and spreading them with continued rotation of the housing 80, which requires little expenditure of effort compared to translational spreading. This is additionally facilitated in that the protruberances 89 have in each case on their two edges in the circumferential direction a tapered edge 89*a* such that the spreading of the securing clamp 12 can proceed continuously and not jerkily.

When the securing clamp 12 is spread, the housing 80 can be translationally shifted to its final position with only a slight expenditure of effort, with the securing clamp 12 snapping into a groove 84* provided in the second housing section 84. The housing 80 is thus secured in its operating position.

The invention claimed is:

1. A solar absorber module comprising:
 a housing with a longitudinal axis, the housing comprising
  a first tapered housing section with a first free end and a second end with a reduced cross-sectional area compared to the first end, and
  a second housing section adjoining the second end of the first housing section with a substantially constant cross-section over its length; and
 a ceramic solar absorber element accommodated in the first end of the first housing section, the absorber element comprising
  a first surface that can be oriented toward the solar radiation with an axis of symmetry, and
  a second surface lying across from the first surface,
 wherein the solar absorber element comprises a large number of substantially straight channels connecting the first surface to the second surface, and
 the solar absorber element is accommodated in the first end of the first housing section such that the axis of symmetry of the first surface is inclined relative to the longitudinal axis of the housing, wherein the housing comprises, in the first tapered housing section, a wall extending over an entire internal cross-section of the first housing section, the wall being provided with a plurality of openings, wherein a cross section of the openings and/or density of the openings per surface unit of the wall increases from a center of the surface of the wall to an edge of the surface of the wall.

2. A solar absorber module comprising:
 a housing with a longitudinal axis, the housing comprising
  a first tapered housing section with a first free end and a second end with a reduced cross-sectional area compared to the first end, and
  a second housing section adjoining the second end of the first housing section with a substantially constant cross-section over its length; and
 a ceramic solar absorber element accommodated in the first end of the first housing section, the absorber element comprising
  a first surface that can be oriented toward the solar radiation with an axis of symmetry, and
  a second surface lying across from the first surface,
 wherein the solar absorber element comprises a large number of substantially straight channels connecting the first surface to the second surface, and
 the solar absorber element is accommodated in the first end of the first housing section such that the axis of symmetry of the first surface is inclined relative to the longitudinal axis of the housing, wherein the housing comprises, in the first tapered housing section, a wall extending over an entire internal cross-section of the first housing section, the wall being provided with a plurality of openings, wherein the wall is configured concavely curved as viewed from a free end of the first housing section.

3. A solar absorber module comprising:
 a housing with a longitudinal axis, the housing comprising
  a first tapered housing section with a first free end and a second end with a reduced cross-sectional area compared to the first end, and
  a second housing section adjoining the second end of the first housing section with a substantially constant cross-section over its length; and
 a ceramic solar absorber element accommodated in the first end of the first housing section, the absorber element comprising
  a first surface that can be oriented toward the solar radiation with an axis of symmetry, and
  a second surface lying across from the first surface,
 wherein
  the solar absorber element comprises a large number of substantially straight channels connecting the first surface to the second surface,
  the solar absorber element is accommodated in the first end of the first housing section such that the axis of symmetry of the first surface is inclined relative to the longitudinal axis of the housing, such that the solar absorber element has a first portion and a second portion, the first portion longitudinally protruding more than the second portion relative to the second housing section, and wherein the first end of the first housing section accommodates both the first portion and the second portion of the solar absorber element, the housing comprises, in the first tapered housing section, a wall extending over an entire internal cross-section of the first housing section, the wall being provided with a plurality of openings, and the housing is produced in combined hollow casting and solid casting.

4. A method for production of the housing for a solar absorber module, the solar absorber module comprising:
   a housing with a longitudinal axis, the housing comprising
      a first tapered housing section with a first free end and a second end with a reduced cross-sectional area compared to the first end, and
      a second housing section adjoining the second end of the first housing section with a substantially constant cross-section over its length; and
   a ceramic solar absorber element accommodated in the first end of the first housing section, the absorber element comprising
      a first surface that can be oriented toward the solar radiation with an axis of symmetry, and
      a second surface lying across from the first surface,
   wherein the solar absorber element comprises a large number of substantially straight channels connecting the first surface to the second surface, and
   the solar absorber element is accommodated in the first end of the first housing section such that the axis of symmetry of the first surface is inclined relative to the longitudinal axis of the housing, wherein the housing comprises, in the first tapered housing section, a wall extending over an entire internal cross-section of the first housing section, the wall being provided with a plurality of openings,
   wherein the housing is produced in combined hollow casting and solid casting, the method comprising:
      creating the housing in combined hollow casting and solid casting, with a region between a first free end of the first housing section and the wall created in solid casting and a region between the wall and a free end of the second section created in hollow casting,
      forming the openings in the wall, and
      subjecting the housing to subsequent high temperature treatment,
   wherein the hollow casting provides a mold with a layer of material and the solid casting provides filling the mold with the material.

5. A solar absorber arrangement with a support structure for a plurality of solar absorber modules, wherein each solar absorber module comprises a housing with a longitudinal axis, the housing comprising
   a first tapered housing section with a first free end and a second end with a reduced cross-sectional area compared to the first end, and
   a second housing section adjoining the second end of the first housing section with a substantially constant cross-section over its length; and
   a ceramic solar absorber element accommodated in the first end of the first housing section, the absorber element comprising
      a first surface that can be oriented toward the solar radiation with an axis of symmetry, and
      a second surface lying across from the first surface,
   wherein the solar absorber element comprises a large number of substantially straight channels connecting the first surface to the second surface, and
   the solar absorber element is accommodated in the first end of the first housing section such that the axis of symmetry of the first surface is inclined relative to the longitudinal axis of the housing wherein the support structure has a front face with an arrangement of first openings and second openings surrounding the first openings, wherein the solar absorber modules are accommodated in the first openings and the second openings are configured for discharge of cooled air flowing back, wherein the second openings are configured as vertical and/or horizontal slits and/or circular openings.

6. A solar absorber module comprising:
   a housing with a longitudinal axis, the housing comprising
      a first tapered housing section with a first free end and a second end with a reduced cross-sectional area compared to the first end, and
      a second housing section adjoining the second end of the first housing section with a substantially constant cross-section over its length; and
   a ceramic solar absorber element accommodated in the first end of the first housing section, the absorber element comprising
      a first surface that can be oriented toward the solar radiation with an axis of symmetry, and
      a second surface lying across from the first surface,
   wherein
      the solar absorber element comprises a large number of substantially straight channels connecting the first surface to the second surface,
      the solar absorber element is accommodated in the first end of the first housing section such that the axis of symmetry of the first surface is inclined relative to the longitudinal axis of the housing, such that the solar absorber element has a first portion and a second portion, the first portion longitudinally protruding more than the second portion relative to the second housing section, and wherein the first end of the first housing section accommodates both the first portion and the second portion of the solar absorber element, and
   the solar absorber element includes top channels defining an L-shaped channel with the first end of the first housing section.

* * * * *

UNITED STATES PATENT AND TRADEMARK OFFICE
CERTIFICATE OF CORRECTION

PATENT NO.         : 8,302,595 B2
APPLICATION NO.    : 13/145549
DATED              : November 6, 2012
INVENTOR(S)        : Udo Hack It is certified that error appears in the above-identified patent and that said Letters Patent is hereby corrected as shown below:

In the Specifications:

- In column 5, line 35, please delete "4 [sic]" and replace with "2".

- In column 5, line 56, please delete "action" and replace with "section".

- In column 5, line 59, please delete "83' [sic]" and replace with "81'".

Signed and Sealed this
Seventh Day of May, 2013

Teresa Stanek Rea
*Acting Director of the United States Patent and Trademark Office*